(12) United States Patent
Uehara (10) Patent No.: US 7,341,180 B2
(45) Date of Patent: Mar. 11, 2008

(54) CARD SETTLEMENT SYSTEM

(75) Inventor: Masahiro Uehara, Saitama (JP)

(73) Assignee: Alpha Network Co., Ltd., Saitama-Shi, Saitama (JP)

( * ) Notice: Subject to any disclaimer, the term of this patent is extended or adjusted under 35 U.S.C. 154(b) by 0 days.

(21) Appl. No.: 10/574,946

(22) PCT Filed: Jan. 29, 2004

(86) PCT No.: PCT/JP2004/000831

§ 371 (c)(1),
(2), (4) Date: Nov. 20, 2006

(87) PCT Pub. No.: WO2005/073885

PCT Pub. Date: Aug. 11, 2005

(65) Prior Publication Data

US 2007/0198358 A1    Aug. 23, 2007

(51) Int. Cl.
*G06K 5/00* (2006.01)

(52) U.S. Cl. ........................ 235/380; 235/493

(58) Field of Classification Search ................ 235/380, 235/375, 382, 381, 492, 486, 493, 487, 383; 705/1, 26, 65, 44, 13; 455/41.2, 552.1
See application file for complete search history.

(56) References Cited

U.S. PATENT DOCUMENTS

| | | | |
|---|---|---|---|
| 6,793,135 B1 * | 9/2004 | Ryoo | 235/383 |
| 6,829,467 B2 * | 12/2004 | Ochiai | 455/41.2 |
| 6,896,182 B2 * | 5/2005 | Sakaguchi | 235/380 |
| 2001/0034707 A1 * | 10/2001 | Sakaguchi | 705/44 |
| 2002/0128857 A1 * | 9/2002 | Lee | 705/1 |
| 2002/0143655 A1 * | 10/2002 | Elston et al. | 705/26 |
| 2003/0078987 A1 * | 4/2003 | Serebrennikov | 709/217 |
| 2004/0173674 A1 * | 9/2004 | Matsuura | 235/380 |
| 2006/0278704 A1 * | 12/2006 | Saunders et al. | 235/382 |
| 2007/0017976 A1 * | 1/2007 | Peyret et al. | 235/380 |
| 2007/0055632 A1 * | 3/2007 | Hogl | 705/65 |

FOREIGN PATENT DOCUMENTS

| JP | 10-91823 | 4/1998 |
|---|---|---|
| JP | 10-188091 | 7/1998 |

* cited by examiner

*Primary Examiner*—Thien Minh Le
(74) *Attorney, Agent, or Firm*—Leydig, Voit & Mayer, Ltd.

(57) ABSTRACT

A user purchases a card on which an identification number is printed and masked, calls a line for registration by the user's mobile telephone terminal in advance, inputs the identification number, and registers the telephone number of the mobile telephone terminal of the user in a settlement processing server. When the user buys a commodity at an affiliated store, the user calls a line for payment using the user's mobile telephone terminal the last N digits of the telephone number are treated as a payment amount of money, and inputs an access number of the affiliated store. When the settlement process is carried out by the settlement processing server, procedure completion information is sent from the telephone exchange to a terminal device having the access number at the affiliated store.

4 Claims, 12 Drawing Sheets

FIG. 3

| TELEPHONE NUMBER FOR PAYMENT | ×××-××××-0000 |
| | ×××-××××-0001 |
| | ×××-××××-0002 |
| | ⋮ |
| | ×××-××××-9999 |

FIG. 4

| AFFILIATED STORE | ACCESS NUMBER |
|---|---|
| ABC DEPARTMENT STORE | ×××-1111 |
| DEF FOODS | ×××-1112 |
| ⋮ | ⋮ |

FIG. 5A

| PIN NUMBER | TELEPHONE NUMBER | OUTSTANDING BALANCE |
|---|---|---|
| 123···456 | | ¥5,000 |
| 123···457 | | ¥5,000 |
| ··· | | ··· |
| ··· | | ··· |
| ··· | | ··· |
| ··· | | ··· |
| ··· | | ··· |
| ··· | | ··· |
| ··· | | ··· |
| ··· | | ··· |
| ··· | | ··· |

FIG. 5B

| PIN NUMBER | TELEPHONE NUMBER | OUTSTANDING BALANCE |
|---|---|---|
| 123···456 | XXX-XXXX | ¥5,000 |
| 123···457 | XXX-XXXX | ¥5,000 |
| ··· | ··· | ··· |
| ··· | ··· | ··· |
| ··· | ··· | ··· |
| ··· | ··· | ··· |
| ··· | ··· | ··· |
| ··· | ··· | ··· |
| ··· | ··· | ··· |
| ··· | ··· | ··· |
| ··· | ··· | ··· |

FIG. 5C

| TELEPHONE NUMBER | OUTSTANDING BALANCE |
|---|---|
| XXX-XXXX | ¥5,000 |
| XXX-XXXX | ¥5,000 |
| ··· | ··· |
| ··· | ··· |
| ··· | ··· |
| ··· | ··· |
| ··· | ··· |
| ··· | ··· |
| ··· | ··· |
| ··· | ··· |
| ··· | ··· |

FIG. 6

| AFFILIATED STORE | ACCESS NUMBER | SALES AMOUNT |
|---|---|---|
| ABC | XXX-1111 | ¥1,500 |
| DEF FOODS | XXX-1112 | ¥8,000 |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |

THE PAYMENT HAS JUST COMPLETED

CUSTOMER'S TEL ×××-××××

FIG. 13

CARD SETTLEMENT SYSTEM

TECHNICAL FIELD

The present invention relates to a card settlement system suitable for purchasing commodities using prepaid cards, in particular to a card settlement system with high security and for which an introductory cost for affiliate shops is low.

BACKGROUND ART

Card settlement methods by a credit card are widespread as a settlement method for shopping. According to such a settlement method by a credit card, there are advantages for customers that they can buy commodities without carrying cash. In addition, for affiliate stores, there are advantages that they can recommend the purchase of commodities to customers who are not carrying cash, and also promote the sales.

However, the settlement method by a credit card carries the risk that someone may steal the card and buy commodities illegally, or cash money from the account. In the event of such an illegal usage of the credit card, a large amount of money could be withdrawn from owner's account.

Prepaid cards are being used for paying rail fares and public telephone fares. Conventionally magnetic cards were used for prepaid cards, but prepaid magnetic cards are easily forged or altered, and illegal usage remains widespread.

Consequently, IC (Integrated Circuit) cards recently have been used as prepaid cards to pay railroad and telephone fare, as shown in Japanese Patent Laid Open Publication No. Hei 10-091823. Regarding IC cards, it is difficult to alter or forge the IC cards, and furthermore additional credit can be charged anytime. In addition, it has become possible to use prepaid IC cards at many affiliated stores, as well as to pay rail fares or telephone charges, as shown for example in Japanese Laid Open Patent Publication No. Hei 10-188091.

However, to enable the use of prepaid IC cards, it is necessary to introduce a POS (Point Of Sales) system which can read IC cards at the affiliate stores. However, the introduction cost of such POS system that can read IC cards is high. Therefore, it is difficult for small-scale shops with little capital to become affiliated shops.

In addition, there are many ways to use the prepaid cards, such that the owners purchase cards and use them, the owners give their cards to their children or other people, or the owners hand them out as souvenirs or giveaways. Moreover, there is a possibility that foreign tourists may purchase prepaid cards and use them for payment.

However, prepaid cards using an IC card are very high cost because the IC card itself is high cost, and also personal information is recorded on the cards. Therefore, as for prepaid cards using an IC card, it is difficult to use in such a way for giving them to other people or handing them out as souvenirs or giveaways.

Moreover, in the present circumstance, a lot of different formats for an IC card are proposed. Under such circumstance that a lot of different formats of IC cards are used, the cards may not be usable in some shops or places, and therefore it causes the users inconvenience.

In view of the above-mentioned problems of the prior art, an object of the invention is to provide a card settlement system that is available for giving cards to other people or distributing them as souvenirs or giveaways, for providing high security, and for providing low introductory cost for affiliate stores.

SUMMARY OF THE INVENTION

A card settlement system according to the invention is characterized in that a card settlement system comprises a settlement processing means for determining payment amount of money by last N digits (N is any integer) of a calling telephone number of a mobile telephone terminal of a user, and for making settlement processing on the basis of the payment amount of money; a telephone exchange means which possesses lines whose last N digits are consecutive as payment lines, in which when there is a call for payment from a mobile telephone terminal of the user, the telephone exchange means sends a telephone number of the mobile telephone terminal of the user and a calling telephone number to the settlement processing means, and when access number of an affiliated store is inputted, the telephone exchange means sends the access number to the settlement processing means and sends completion procedure information to a terminal device of the affiliated shop; wherein the user purchases a card on which an identification number has been masked-printed, calls up a line for registration by the user's mobile telephone terminal in advance, inputs the identification number of the card, and registers the telephone number of the mobile telephone terminal of the user; when the user buys a commodity at an affiliated store, the user calls up a line for payment by the mobile telephone terminal which the user has, the last N digits of the telephone number are treated as payment amount of money, and inputs access number of the affiliated store; when the settlement process is made by the settlement processing means, procedure completion information is sent from the telephone exchange means to the access number of the terminal device at the affiliate shop.

Preferably, the telephone exchange means sends procedure completion information to the access numbers of the affiliated store by voice message. Preferably the telephone exchange means sends procedure completion information to the access numbers of the affiliated store by electronic mail. Preferably the telephone exchange means provides sales information to the access number of the affiliated store by means of web pages.

According to the invention, calling for settlement and inputting for a payment fare are made simultaneously so that the operationality is improved, and it is difficult to change the outstanding balance illegally so that a high security settlement system can be realized.

Moreover, a production cost of the card is lower, and a card can give other person or use as a disposal card so that personal information cannot be described into the card itself.

According to the invention, special devices are not needed for an affiliate store as a terminal device so that there are advantages that introduction cost is low.

DETAILED DESCRIPTION OF THE PREFERRED EMBODIMENTS

Referring to the drawings attached, there now follows an explanation of the embodiments of the present invention.

First Embodiment

Figure 1:
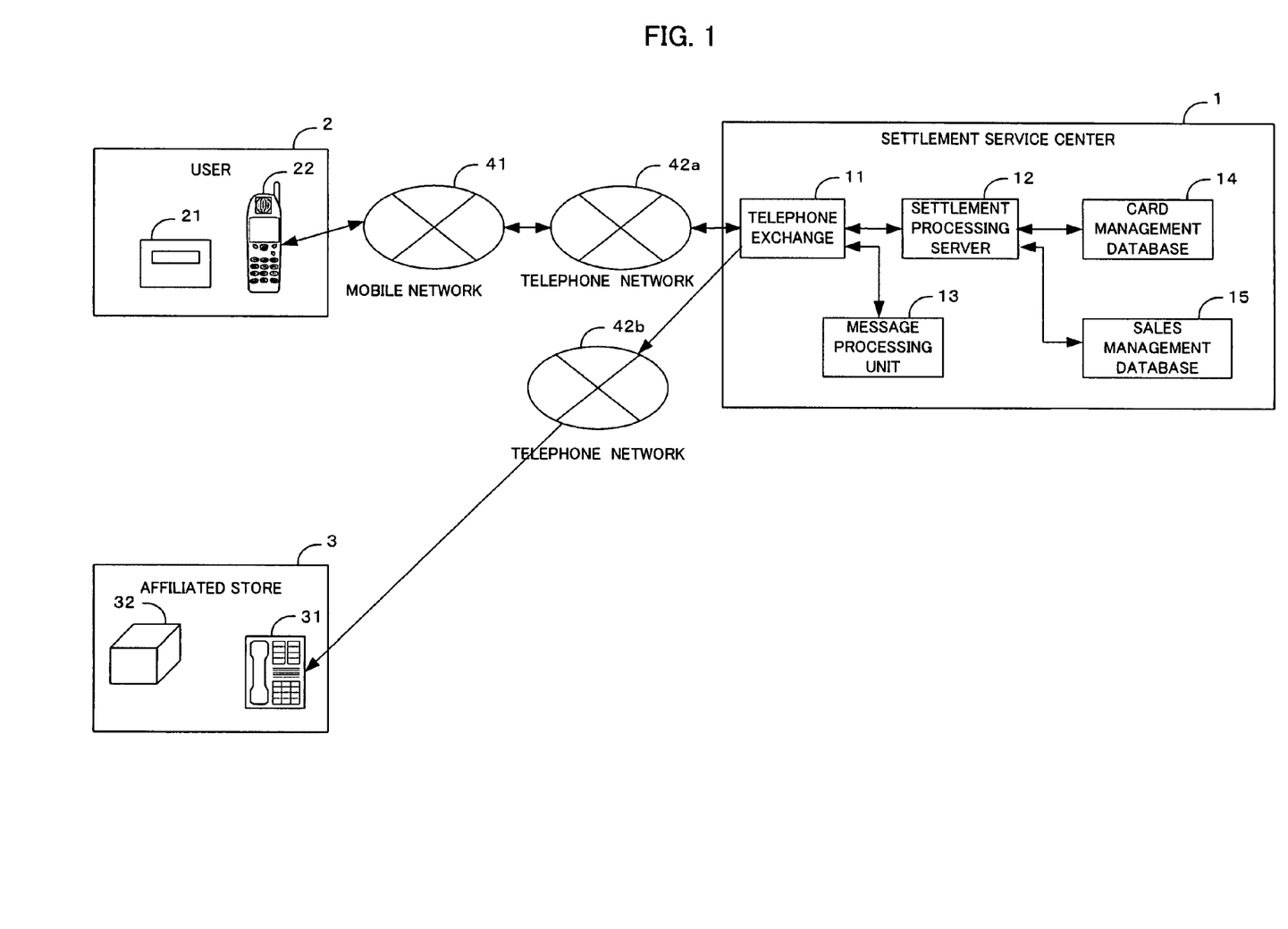
FIG. 1 is a block diagram of a first embodiment of the invention.

FIG. 1 shows a first example of the invention. In FIG. 1, numeral 1 shows a settlement service center which provides a settlement service using a prepaid card, numeral 2 shows a user who purchases a commodity 32 using a prepaid card 21, and numeral 3 shows an affiliated store which sells a commodity 32.

In the settlement system according to the invention, a card called scratch card is used as the prepaid card 21. Namely a scratch print information portion 23 is provided on the prepaid card 21 as shown in FIG. 2. A PIN (Personal Identification Number) number is printed in the scratch print information portion 23. The PIN number is a unique number for each card.

Figure 2A:
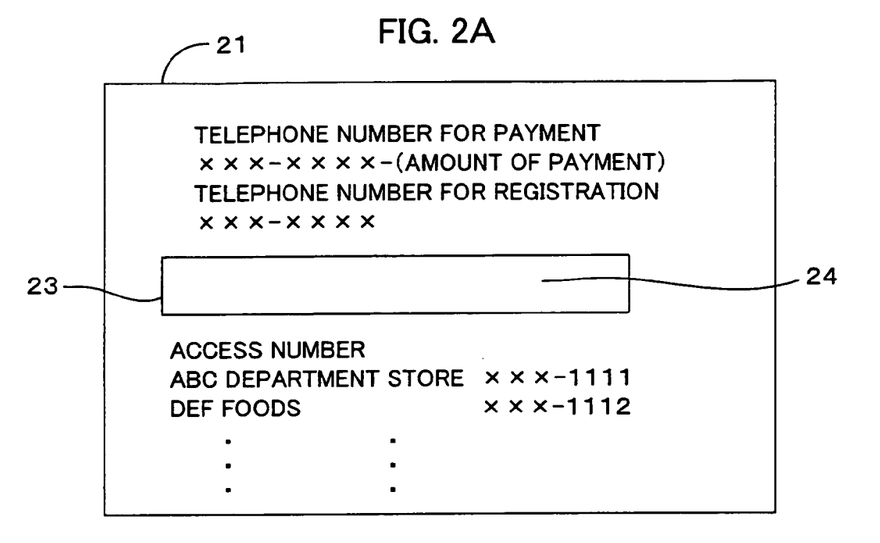
FIGS. 2A and 2B are explanation drawings showing a configuration of a card to which the invention can be applied.
Figure 2B:
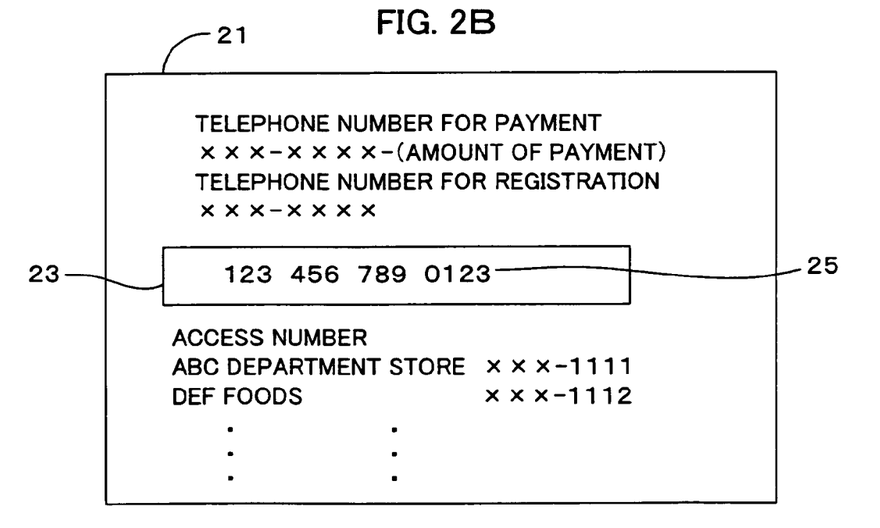

When the prepaid card 21 is sold, as shown in FIG. 2A, a scratch print 24 or a seal which is printed in silver ink or the like is provided on the scratch print information portion 23 (or a seal covered) such that the PIN number 25 is concealed. As shown in FIG. 2B, the PIN number 25 is revealed at the scratch print information portion 23 by scratching and tearing off the scratch print 24 which covers the scratch print information portion 23 by coin etc.

Furthermore, a method for using a prepaid card 21 is printed on the prepaid card 21, as well as the registration and payment telephone numbers in the settlement service center 1, and access numbers for respective affiliated stores.

The prepaid card 21 is purchased by paying predetermined money such as 1,000 yen, 3,000 yen, or 5,000 yen. The user 2 can buy a commodity 32 at the affiliated store 3 up to the amount of the prepaid card 21 that he or she has paid. The prepaid card 21 is issued and managed by the settlement service center 1, and is buyable at any of the affiliated stores 3. In addition, the prepaid card 21 could be sold at kiosks, convenience stores, or the vending machines.

In FIG. 1, the user 2 possesses a mobile telephone terminal 22; the mobile telephone terminal 22 of the user 2 can be connected with a telephone exchange 11 in the settlement service center 1 via a mobile network 41 and a telephone network 42a. To buy a commodity 32 at an affiliated store 3 using prepaid card 21, it is necessary to register the telephone number of the mobile telephone terminal 22 of the user 2 to the card management database 14 in the settlement service center 1 by a registration process in advance.

After the user 2 carries out the registration process, the user 2 can buy commodities 32 at the affiliated stores 3 up to the amount of the prepaid card 21 that he or she has paid.

When the user purchases a commodity 32 at the affiliated store 3, the user 2 calls to the settlement service center 1 using his or her mobile telephone terminal 22. At this time, for example, the last four digits of the telephone number are treated as payment amount of money. Next, the user 2 inputs the access number of each affiliated store 3 in accordance with a voice message sent from the settlement service center 1. The payment process is carried out through a series of procedures. After the payment process is completed, a voice message of completion of the payment is sent from the settlement service center 1 to the telephone terminal 31 in the affiliated store 3. The affiliated store 3 can confirm the fact that the payment has been made by receiving the voice message of completion of the payment. After confirming the payment information made by such a voice message, the affiliated store 3 can hand over the commodity 32 to the user 2.

Figure 3:
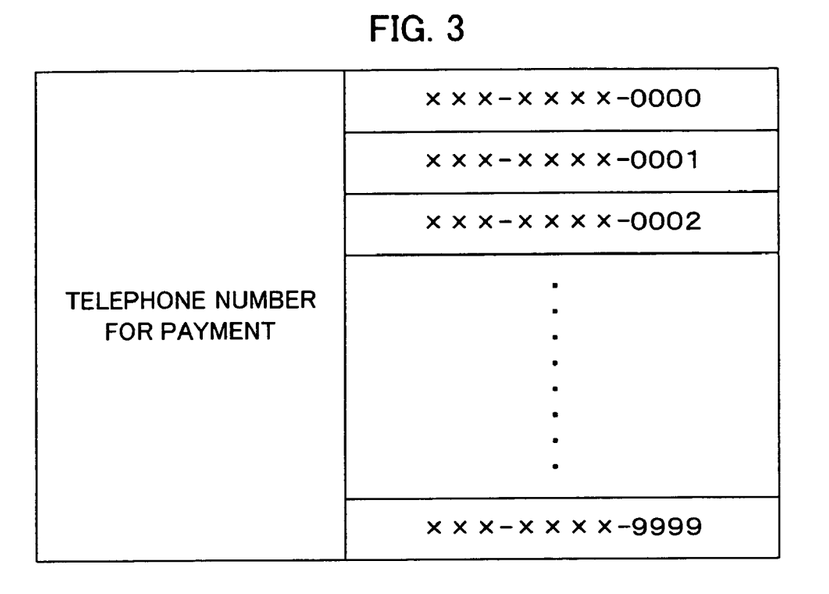
FIG. 3 is an explanation drawing of a telephone number for settlement.

To put it more clearly, as shown in FIG. 3, the settlement service center 1 allocates telephone numbers from (xxx-xxx-0000) to (xxx-xxx-9999) in possession, whose last four digits are consecutive. When the user 2 buys a commodity of 1,000 yen, he or she calls the telephone number (xxx-xxx-1000) to make the payment. When the user 2 buys a commodity of 0050 yen, he or she calls the telephone number (xxx-xxx-0050). In this way, when the user 2 calls the settlement service center 1 using the mobile telephone terminal 22, the last four digits of the telephone number, for example, are used to show the payment amount of money.

Although, in this example, the last four digits are used to show the payment amount of money, it is not limited only to the above example.

Figure 4:
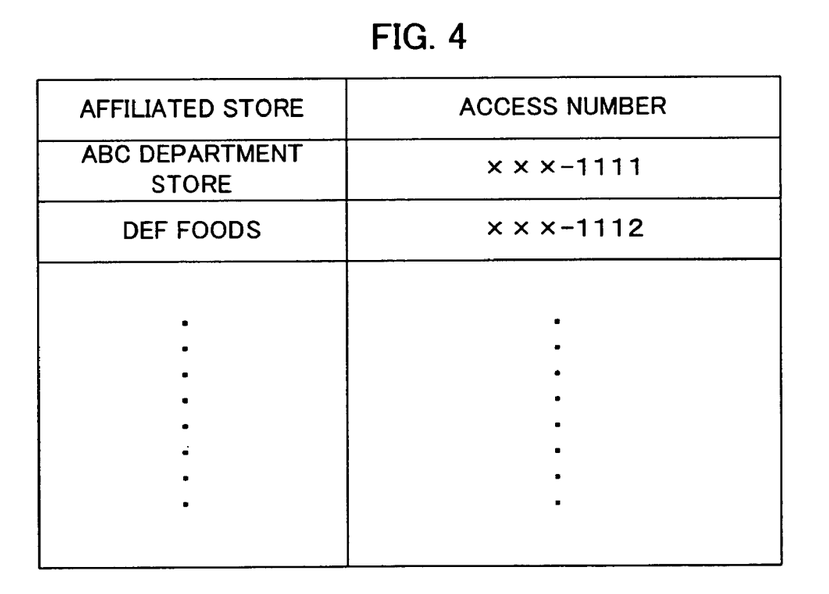
FIG. 4 is an explanation drawing of access numbers.

Each access number is assigned to each affiliated store 3 as shown in FIG. 4. After connecting to the telephone line for payment, the user 2 inputs the access number in the affiliated store 3. For example, in buying a commodity at ABC department store, the access number (xxx-1111) of ABC department store is inputted.

For the access number for each affiliated store 3, the telephone number of each affiliated store 3 can be used. It is also possible that the settlement service center 1 assigns another access number for each affiliated store 3. Moreover, for the telephone network 42b between the affiliated store 3 and the settlement service center 1, it is possible to use a public telephone network or a dedicated telephone network.

In FIG. 1, the settlement service center 1 has a telephone exchange 11 and a settlement processing server 12. The telephone exchange 11 is connected to a message processing part 13 with an automatic voice answer function.

The settlement processing server 12 is connected to a card management database 14 and a sales management database 15. The card management database 14 includes the information of PIN numbers of each prepaid card 21, mobile telephone numbers, and the outstanding balance, as shown in FIG. 5. In addition, the sales management database 15 includes information of access numbers and total sales for each affiliated store 3, as shown in FIG. 6.

As previously mentioned, when buying a commodity 32 at the affiliated store 3, the user 2 calls the settlement service center 1 using the mobile telephone terminal 22, and at this time, for example last four digits of the telephone number are used to offer the payment amount of money. When the user 2 calls the settlement service center 1 using the mobile telephone terminal 22, CLI (Calling Line Identification) is outputted from the telephone exchange 11 in the settlement service center 1. From this CLI, the calling telephone number of the mobile telephone terminal 22 and the called telephone number can be recognized. The payment amount of money can be recognized from the last four digits of the called telephone number. The CLI is sent from the telephone exchange 11 in the settlement service center 1 to the settlement processing server 12, and the settlement process is carried out at the settlement processing server 12 using the payment amount money obtained from the last four digits of the called telephone number.

After this kind of settlement process is carried out, a payment completion voice message is sent from the settlement service center 1 to the affiliated store 3. A terminal device, in this example, a telephone terminal 31 is provided at the affiliated store 3 to receive the payment completion information sent from the settlement service center 1. The telephone terminal 31 in the affiliated store 3 can be connected to the settlement processing server 12 via the telephone network 42b.

In the case when a telephone terminal 31 is used in the affiliated store 3, after the settlement process is completed as previously mentioned, the telephone exchange 11 in the settlement service center 1 calls the telephone terminal 31 in the affiliated store 3, and a voice message that notifies payment completion is sent to the telephone terminal 31 in the affiliated store 3 as payment completion information. The affiliated store 3 can confirm that the payment has been made by receiving the payment completion information from the voice message. After having confirmed that the payment was made from the voice message, the affiliated store 3 can hand over the commodity 32 to the user 2.

As previously mentioned, the card management database 14 and the sales management database 15 are provided in the settlement processing server 12. The information of outstanding balance in the card management database 14 is deducted every time a user 2 makes a payment. Each user 2 is able to use a prepaid card 21 until the information of outstanding balance becomes "0". On the other hand, the sales amount of the sales management database 15 for each affiliated store 3 is increased every time payment is made. On a predetermined account settlement day, sales amount is sent from the settlement service center 1 to each affiliated store 3 on the basis of the information of sales amount in the sales management database 15.

At this point, if the settlement service center 1 pays 90 percent of the sales amount to the affiliated stores 3, the settlement service center 1 would make a profit of 10 percent.

The process of each part is explained as follows. As previously mentioned, in this embodiment, the users 2 calls the settlement service center 1 using his or her own mobile telephone terminal 22, and the registration process is made. The following is an explanation of the registration process.

Figure 7:
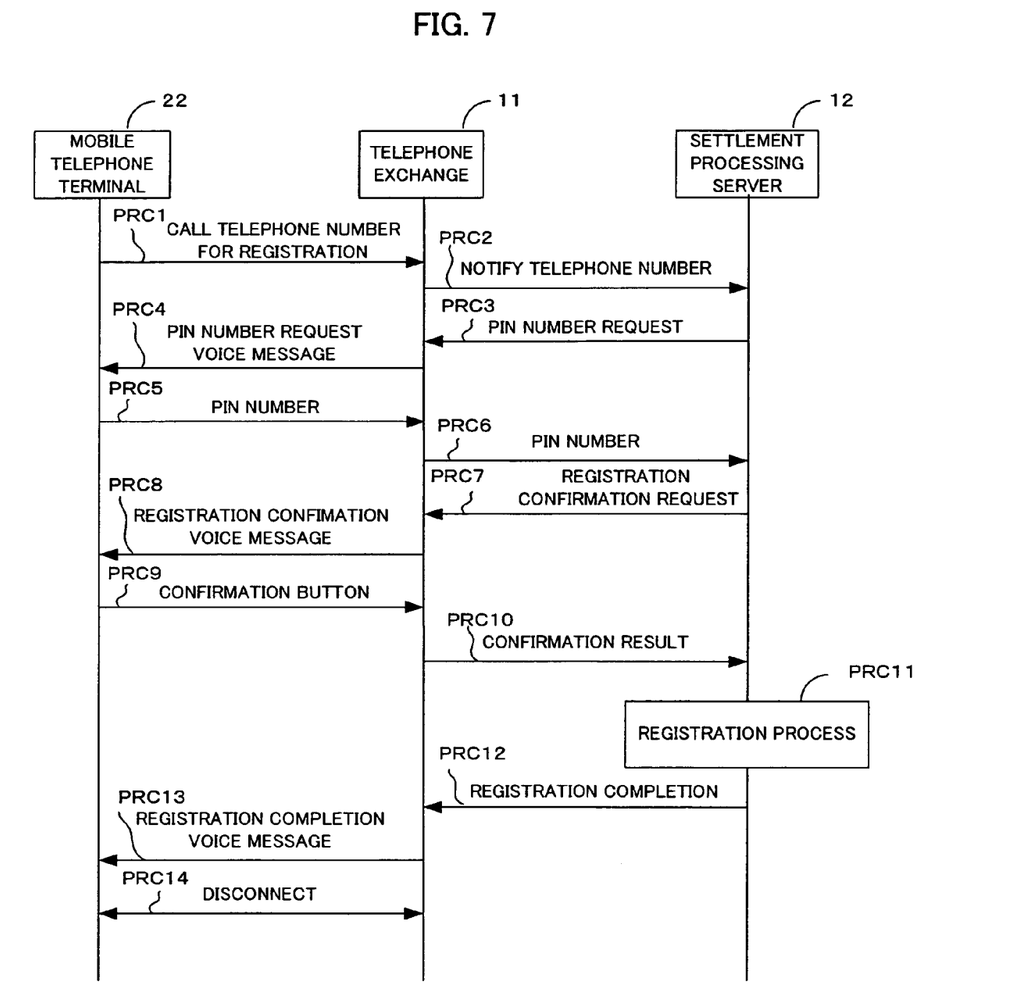
FIG. 7 is a sequence diagram for explaining a card registration process.

FIG. 7 shows an example of the registration process. As shown in FIG. 7, the user 2 calls a telephone number for registration using his or her own mobile telephone terminal 22 (process PRC1). When the telephone exchange 11 in the settlement service center 1 receives the call from the mobile telephone terminal 22, it sends the telephone number of calling mobile telephone terminal 22 to the settlement processing server 12 (process PRC2). The telephone number of the mobile telephone terminal 22 can be recognized by the CLI, for example, which is sent from the telephone exchange 11 to the settlement processing server 12.

After the settlement processing server 12 receives the telephone number, it sends a PIN number request to the telephone exchange 11 (process PRC3). When the telephone exchange 11 receives the PIN number request, it sends an PIN number request voice message to the mobile telephone terminal 22 of the user 2 (process PRC4). The PIN number request voice message is a voice message such as "Please input your PIN number". That voice message is generated by means of the message processing part 13.

The user 2 identifies the PIN number 25 by scratching or tearing off the silver or similar scratch print that covers the scratch print information portion 23 of the prepaid card 21 which he or she purchased by a coin (see FIG. 2). After listening to the input PIN number request voice message, he or she inputs the PIN number of the prepaid card 21 which he or she has paid into the mobile telephone terminal 22, and sends it to the settlement service center 1 (process PRC5).

After the telephone exchange 11 in the settlement service center 1 receives the PIN number from the mobile telephone terminal 22 of user 2, it sends the PIN number to the settlement processing server 12 (process PRC6). When the settlement processing server 12 receives the PIN number, it sends a registration confirming request to the telephone exchange 11 (process PRC7). After the telephone exchange 11 receives the registration confirming request from the settlement processing server 12, it sends a registration confirmation voice message to the mobile telephone terminal 22 of the user 2 (process PRC8). The registration confirmation voice message is a voice message such as "May I register your prepaid card?". The voice message is produced by means of the message processing part 13.

After listening to the registration confirmation voice message, the user 2 inputs a confirmation button (for example, the button of "#") on the mobile telephone terminal 22, and sent it to the settlement service center 1 (process PRC9). When the telephone exchange 11 in the settlement service center 1 receives the signal of the confirmation button from the mobile telephone terminal 22, it sends the confirmation result to the settlement processing server 12 (process PRC10). Then the settlement processing server 12 carries out the registration process in the card management database 14 using the PIN number sent from the user's mobile telephone terminal 22 and the telephone number of the mobile telephone terminal 22 (process PRC11).

As previously mentioned, the settlement processing server 12 is connected to a card management database 14 which manages information for each prepaid card issued by the settlement processing server 12. The card management database 14 includes PIN numbers, telephone numbers, and amount of outstanding balance.

Figure 5A:
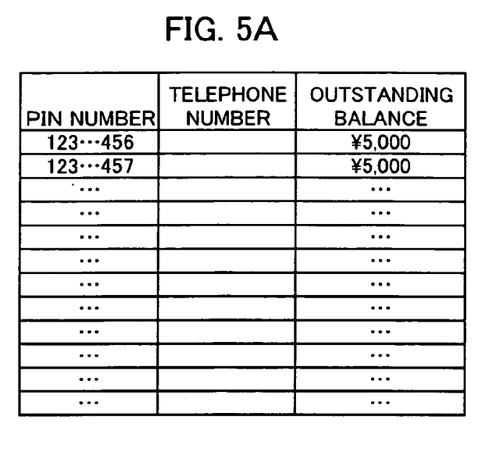
FIGS. 5A, 5B and 5C are explanation drawings of a card management database.
Figure 6:
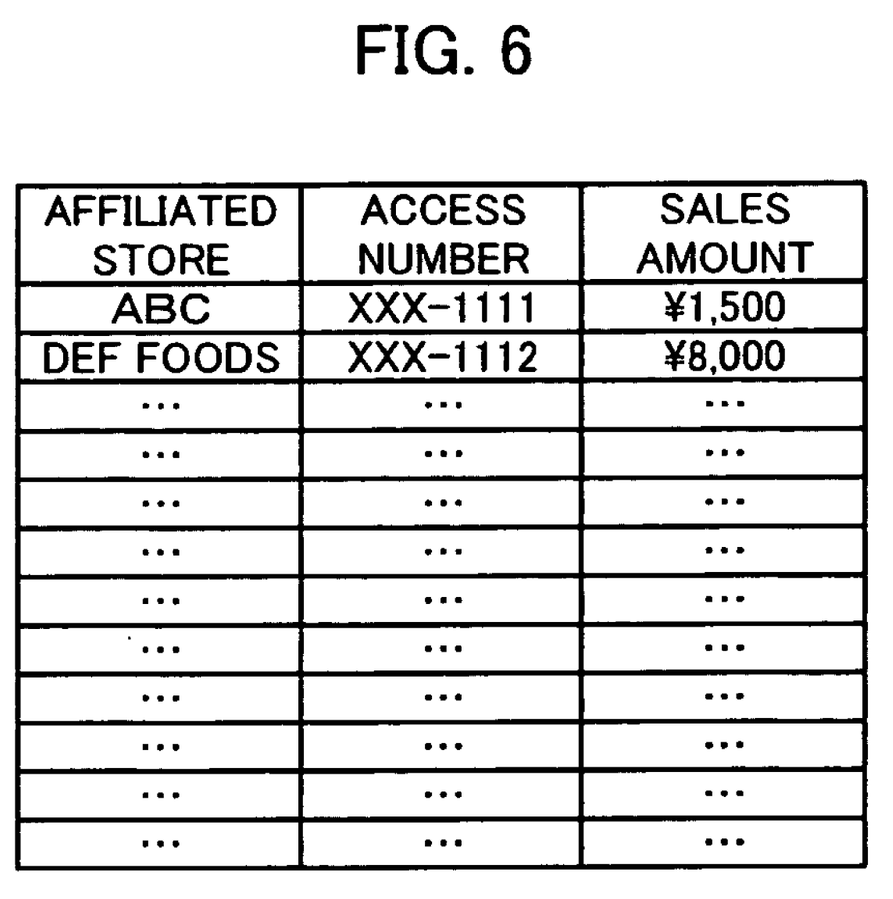
FIG. 6 is an explanation drawing of a payment management database.

Before the registration process is made, the fields of the PIN number and the outstanding balance has been already described, whereas the field of the telephone number is blank on the card management database 14 as shown in FIG. 5A.

Figure 5B:
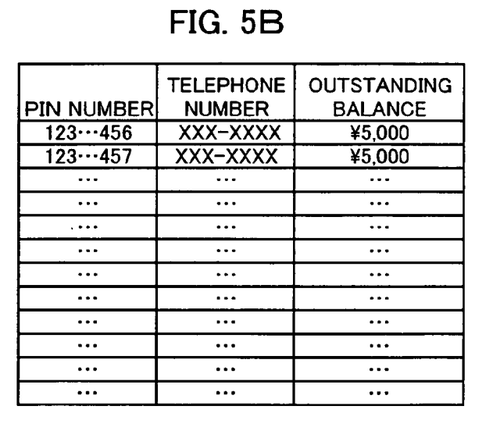
Figure 5C:
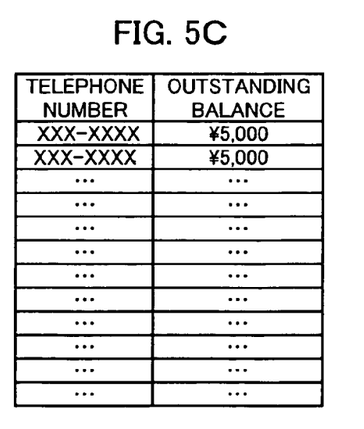

After the registration process is made, the telephone number of the mobile telephone terminal 22 used in the registration process and the input PIN number are related, and the telephone number of the mobile telephone terminal 22 of the user 2 is described in the field of the telephone number as shown in FIG. 5B. Then, as shown in FIG. 5C, the field of the PIN number is deleted. In this manner, the PIN number is deleted, and therefore the security is enhanced, because the same card cannot be registered again.

In FIG. 7, after the registration process to the card management database 14 is completed, the settlement processing server 12 sends a registration completion signal to the telephone exchange 11 (process PRC12). After the telephone exchange 11 receives the registration completion signal from the settlement processing server 12, it sends a registration completion voice message to the mobile telephone terminal 22 of the user 2 (process PRC13). The registration completion voice message is a voice message such as "The registration of the prepaid card is completed". Such a voice message is produces by means of the message processing part 13. After the series of the registration process is completed, the telephone line is disconnected (process PRC14).

Figure 8:
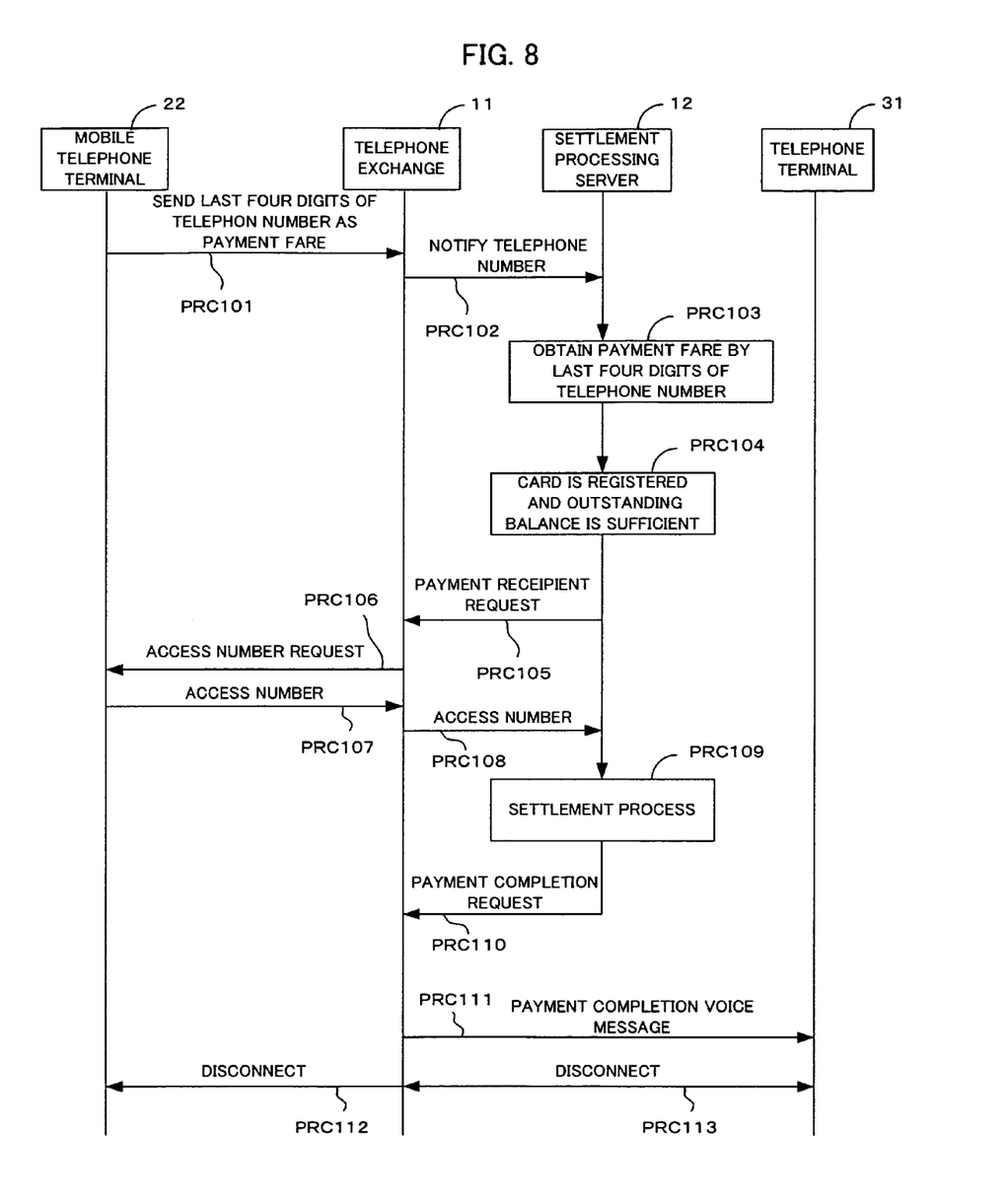
FIG. 8 is a sequence diagram for explaining a settlement process.
Figure 9:
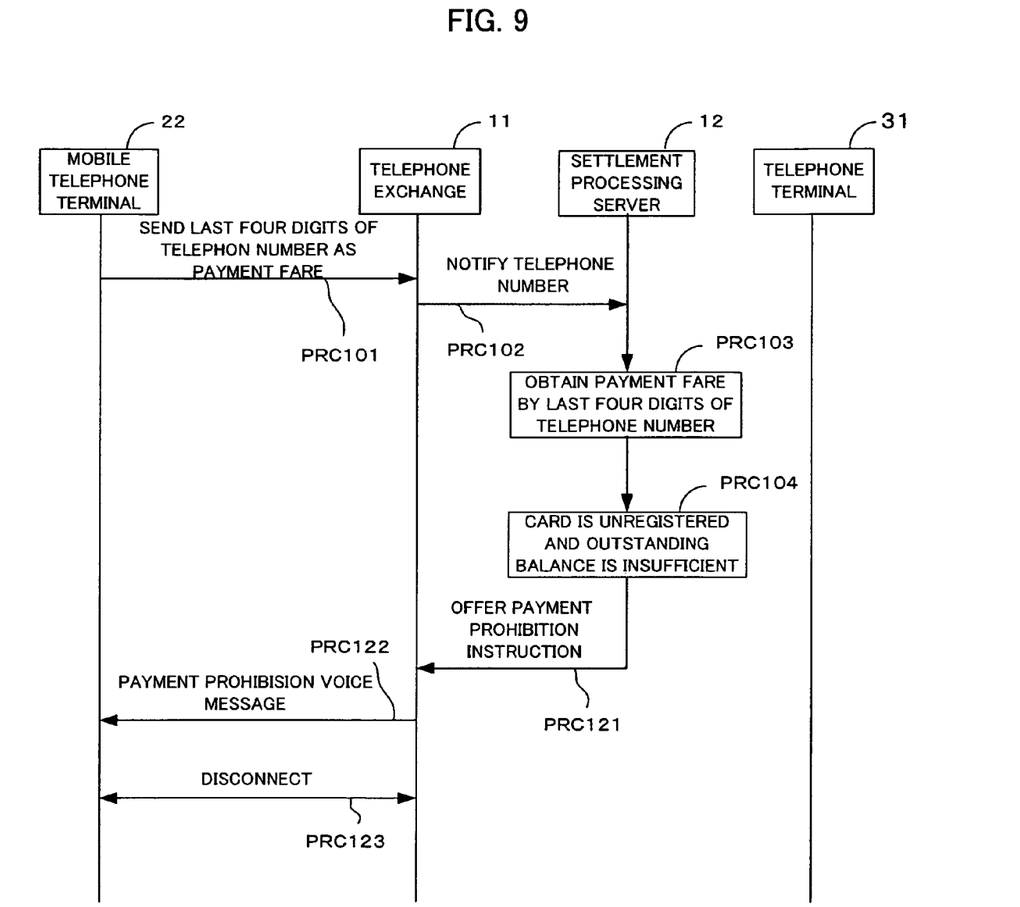
FIG. 9 is a sequence diagram for explaining a settlement process.

FIG. 8 and FIG. 9 show a payment process of commodities. As shown in FIG. 8 and FIG. 9, the user 2 calls the telephone number for payment of the settlement service center 1 using his or her own mobile telephone terminal 22, where the last four digits of the telephone number are treated as payment fare (process PRC101). After the telephone exchange 11 in the settlement service center 1 receives the calling from the mobile telephone terminal 22, it sends the telephone number of the mobile telephone terminal 22 and the called telephone number which the mobile telephone terminal 22 is calling to the settlement processing server 12 (process PRC102). The information is recognized, for example, by the CLI which is sent from the telephone exchange 11 to the settlement processing server 12.

The settlement processing server 12 recognizes the last four digits of the calling telephone number, and obtains the information of the payment fare (process PRC103). Then the settlement processing server 12 determines whether or not the card corresponding to the telephone number of the mobile telephone terminal 22 has been already registered, and also the amount money of the card is sufficient by referring to the card management database 14 (process PRC104).

At this point, if the outstanding balance is insufficient or the phone number of the mobile telephone terminal 22 has not been registered yet, as shown in FIG. 9, the settlement processing server 12 in the settlement service center 1 sends a payment prohibition instruction to the telephone exchange 11 (process PRC121). After the settlement processing server 12 receives the payment prohibition instruction, it sends a payment prohibition voice message to the mobile telephone terminal 22 of the user 2 (process PRC122). The payment prohibition voice message is a voice message such as "This card can not be used". That voice message is generated by means of the message processing part 13. Then the line between the mobile telephone terminal 22 and the telephone exchange 11 is disconnected (process PRC123).

If the telephone number of the mobile telephone terminal 22 has already been registered and the outstanding balance is sufficient at the process PRC104, as shown in FIG. 8, the settlement processing server 12 in the settlement service center 1 sends payment recipient request to the telephone exchange 11 (process PRC105). After the telephone exchange 11 receives the payment recipient request from the settlement processing server 12, it sends an access number request voice message to the mobile telephone terminal 22 of the user 2 (process PRC106). The access number request voice message is a voice message such as "Please input the access number of the payment recipient shop". That voice message is generated by means of the message processing part 13.

After listening to the input the access numbers request voice message, the user 2 inputs access number from the mobile telephone terminal 22, and sends it to the settlement service center 1 (process PRC107).

After the access number is sent from the mobile telephone terminal 22 of the user 2, the telephone exchange 11 in the settlement service center 1 sends the access number to the settlement processing server 12 (process PRC108). Then the settlement processing server 12 carries out a settlement process (process PRC109). Namely, the settlement processing server 12 deducts the value corresponding to the last four digits of the telephone number from the outstanding balance of the card in management database 14, and adds the corresponding value to the sales amount of the affiliated store in the sales management database 15.

After the settlement process is carried out, a completing payment request is sent from the settlement processing server 12 to the telephone exchange 11 (process PRC110). The telephone exchange 11 in the settlement service center 1 connects the line to the telephone terminal 31 at the affiliated store 3 in compliance with the access number inputted on the mobile telephone terminal 22, then sends a payment completion voice message (process PRC111). The payment completion voice message is a voice message such as "The payment has just been completed". The voice message is produced by means of the message processing part 13.

The affiliated store 3 can confirm that the payment has been completed by listening to the payment completion message, and thereby the affiliated store 3 can hand over the commodity 32 to the user 2. After the series of the settlement procedures are completed, the line between the mobile telephone terminal 22 and the telephone exchange 11 is disconnected (process PRC112), and the line between the telephone terminal 31 in the affiliated store 3 and the telephone exchange 11 is also disconnected (process PRC113).

Although in this example a telephone terminal 31 is used as a terminal device of an affiliated stores 3, the telephone terminal 31 can be not only a wired telephone terminal, but also a wireless mobile telephone terminal.

Second Embodiment

With respect to the above-mentioned first embodiment, a telephone terminal 31 is used as the terminal device of an affiliated store 3, and a payment completion voice message is sent from the settlement service center 1 to the telephone terminal 31. Since telephone terminals 31 are widespread, and assuming that the telephone terminal 31 is used as the terminal device, it would make the advantage that even though shops located countryside where it is inconvenient for transport and communications, or small shops with little capital, can become affiliated stores.

However, in such a constitution, every time payment by prepaid card 21 is made, the settlement service center 1 has to call the telephone terminal 31 in the affiliated store 3, and the affiliated store 3 has to listen to the payment voice.

Figure 10:
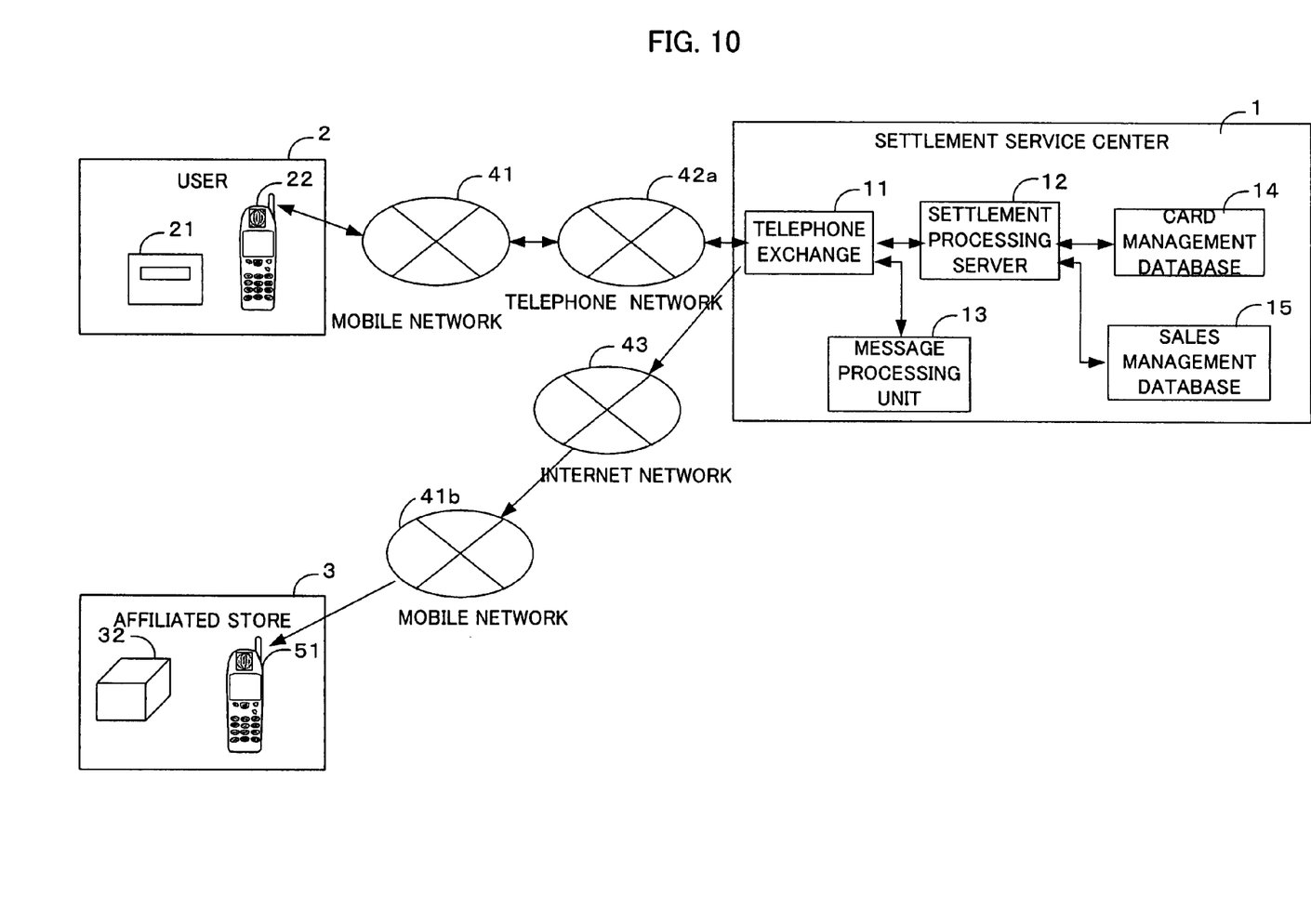
FIG. 10 is a block diagram of a second embodiment of the invention.

FIG. 10 shows the second embodiment of the invention. In this example, a mobile telephone terminal 51 with a mail function is used as the terminal device of an affiliated store 3. The mobile telephone terminal 51 can be connected to the Internet network 43 via a mobile network 41b. The e-mail address of each affiliated store 3 is recorded in the sales management database 15. The rest pats of the constitution are the same as in the first embodiment previously mentioned.

Figure 11:
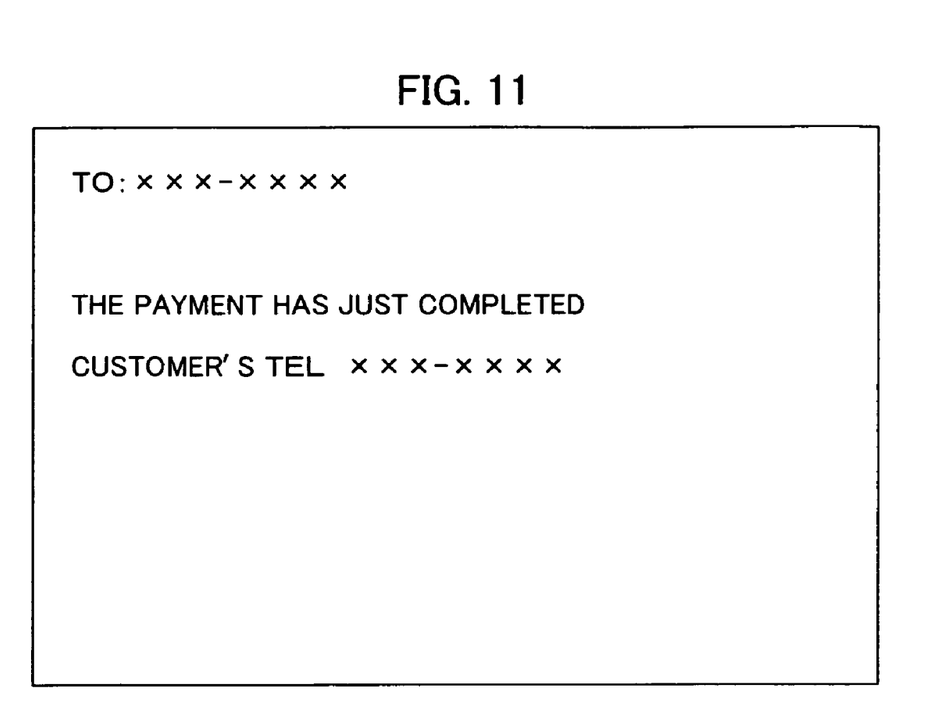
FIG. 11 is an explanation drawing in case that the procedure completion information is sent by e-mail.

With respect to the example, when a user 2 buys a commodity 32 at an affiliated store 3, he or she calls the settlement center 1 using a mobile telephone terminal 22, at that time the last four digits of the telephone number are treated as payment amount of money, and then he or she inputs the access number of each affiliated store 3 in accordance with a voice message, then payment completion information of e-mail is sent from the settlement service center 1 to the mobile telephone terminal 51 in the affiliated store 3 via the Internet network 43 and the mobile network 41b as shown in FIG. 11. The affiliated store 3 can confirm the completion of the payment by the e-mail.

In this example, payment completion information is received by mail using a mobile telephone terminal 51 with a mail function, but it is possible to receive the payment completion information by mail using a PDA (Personal Digital Assistant) or a personal computer that can be connected to the Internet.

Third Embodiment

Figure 12:
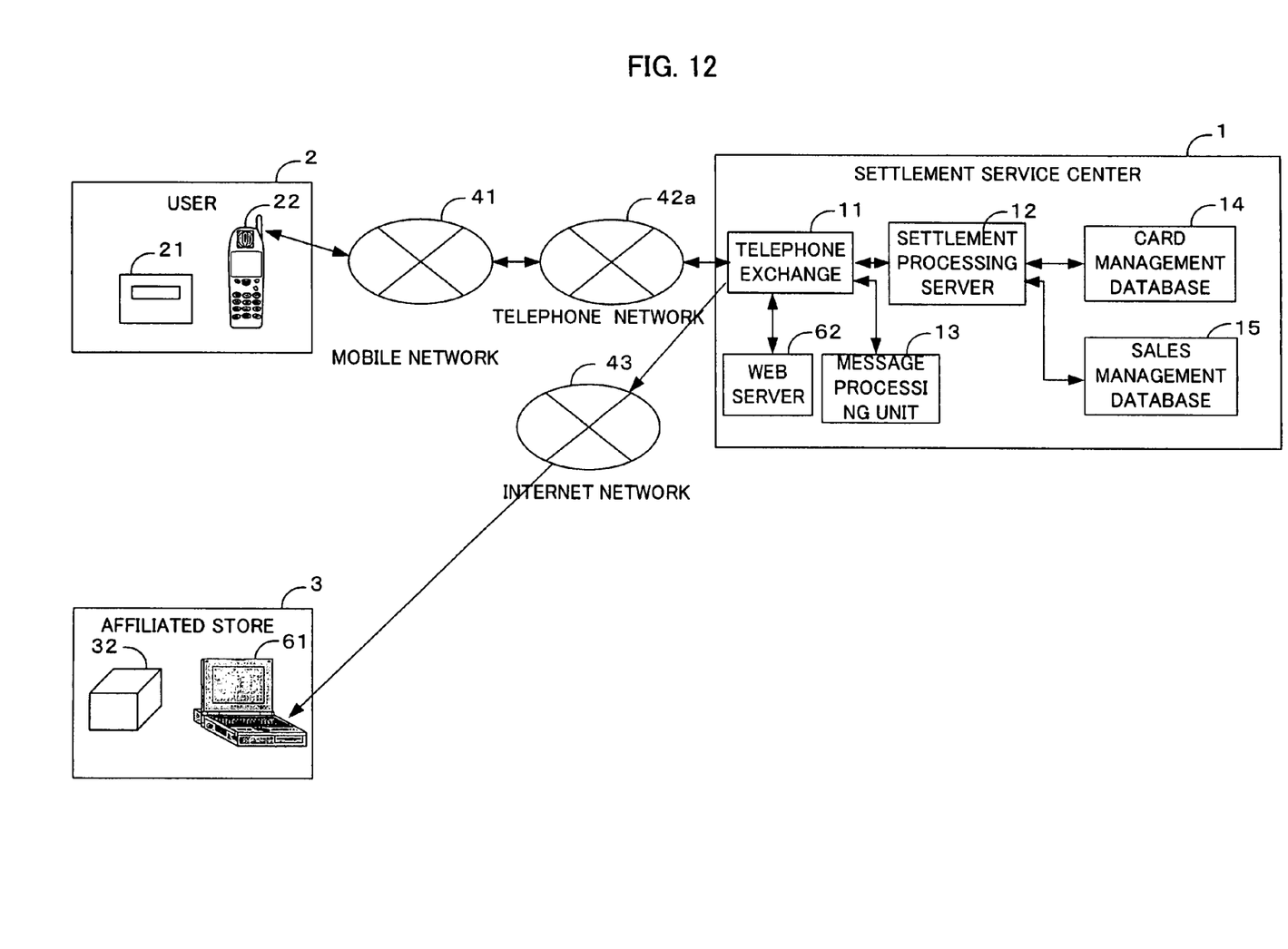
FIG. 12 is a block diagram of a third embodiment of the invention.
Figure 13:
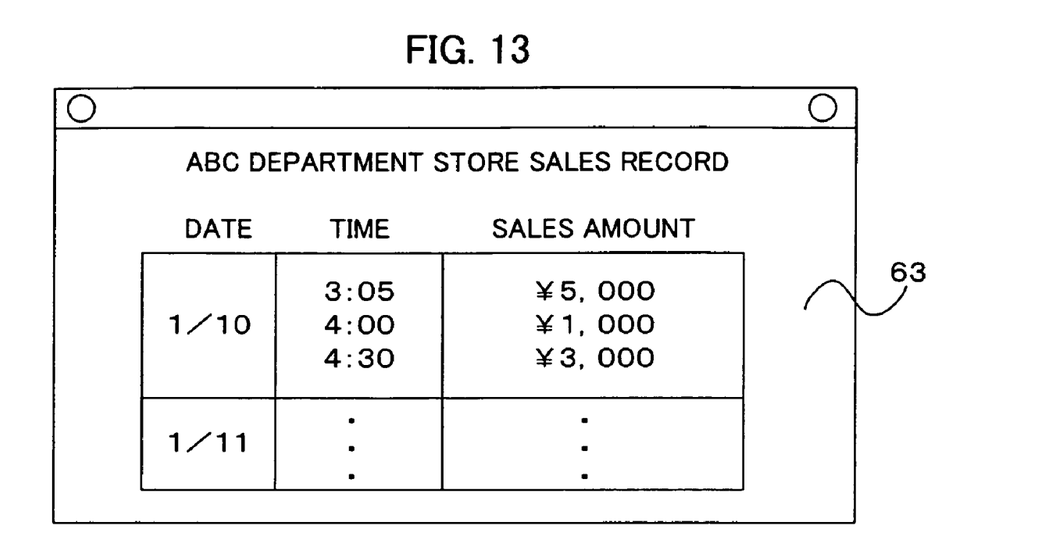
FIG. 13 is an explanation drawing showing sales information.

FIG. 12 shows a third embodiment of the invention. In this example, a personal computer 61 which can be connected to the Internet is provided as a terminal device in the affiliated store 3. In addition, the settlement service center 1 has a web server 62. Web pages 63 for each affiliated stores 3 are provided in the web server 62 as shown in FIG. 13. Sales information for each affiliated store 3 is described in the web pages 63 on the basis of the information in a sales management database 15.

In this embodiment, when the user 2 buys a commodity 32 at an affiliated store 3, a settlement process is carried out in such a manner that he or she calls the settlement service center 1 using a mobile telephone terminal 22, at that time, the last four digits of the telephone number are treated as a payment amount of money, and he or she inputs an access number for each affiliated store 3 in accordance with a voice message, payment completion information is sent from the settlement service center 1 to the personal computer 61 at the affiliated store 3 by e-mail. In addition, after the settlement process is completed, the web pages 63 which shows the sales amount of each affiliated store 3 are updated on the basis of the sales management database 15. Each affiliated store 3 can recognize their sales amount by referring the web pages 63 of the each affiliated store 3.

In this embodiment, a personal computer 61 is used to view the information of web pages 63 for each affiliated store 3, but it is also possible to use a mobile telephone terminal or a PDA that can browse web pages.

As is explained above, in the settlement system according to the invention, the last four digits of the telephone number are treated as payment amount of money. Therefore, a user 2 can call a settlement service center 1 and input the payment fare simultaneously, thus the operationality is improved.

Telephone networks 42a, 42b and the mobile network 41 are strictly managed networks so that it is difficult to illegally operate the telephone number of the mobile telephone terminal 22 or the telephone number being called. In addition, the prepaid card 2 is a scratch card that does not include important information other than the PIN number, and also the PIN number is deleted after registration. Therefore, a high security settlement system can be realized.

In addition, with respect to the affiliated store 3, special equipment is not needed other than the normal telephone terminal 31, the mobile telephone terminal 51, or the personal computer 61 as the terminal devices, and therefore, it has the advantage that the introductory cost is low.

Moreover, for the settlement processing system according to the invention, a scratch card is used as prepaid card. The production cost of the prepaid scratch card is low and personal information is not described on the cards. Therefore the cards can be used as gifts or as disposable cards.

The present invention should not be restricted to the above-mentioned embodiments; various modifications and applications should be allowed without departing the spirit and the scope of the present invention. In addition it is possible to combine each of the embodiments.

INDUSTRIAL APPLICABILITY

As is mentioned above, the invention is suitable for a prepaid card settlement system for paying predetermined money to purchase a card, and buying commodities at affiliate shops up to the amount of the card.

What is claimed is:

1. A card settlement system comprising:
    settlement processing means for determining a payment amount of money by the last N digits (N is any integer) of a called telephone number called by a mobile telephone terminal of a user, and for settlement processing based on the payment amount of money;
    telephone exchange means, which possesses lines having last N digits that are consecutive as payment lines, in which, when there is a call for payment from the mobile telephone terminal of the user, said telephone exchange means sends the telephone number of the mobile telephone terminal of the user and a called telephone number to said settlement processing means, and, when an access number of an affiliated store is input, said telephone exchange means sends the access number to said settlement processing means and sends completion procedure information to a terminal device of the affiliated store, wherein
    the user purchases a card on which an identification number has been printed and masked, calls a line for registration of the user's mobile telephone terminal in advance, inputs the identification number of the card, and registers the telephone number of the mobile telephone terminal of the user,
    when the user buys a commodity at an affiliated store, the user calls a line for payment using the mobile telephone terminal of the user, the last N digits of the telephone number are treated as a payment amount of money, and inputs the access number of the affiliated store, and
    when the settlement process is carried out by said settlement processing means, procedure completion information is sent from said telephone exchange means to the terminal device having the access number at the affiliated store.

2. The card settlement system according to claim 1, wherein said telephone exchange means sends the procedure completion information to the affiliated store having the access number in a voice message.

3. The card settlement system according to claim 1, wherein said telephone exchange means sends the procedure completion information to the affiliated store having the access number in an electronic mail.

4. The card settlement system according to claim 1, wherein said telephone exchange means presents sales information to the affiliated store having the access number via web-pages.

* * * * *